United States Patent
Bargauan

(10) Patent No.: US 6,411,977 B1
(45) Date of Patent: Jun. 25, 2002

(54) METHOD FOR REDUCING COMPUTATIONAL ERRORS IN A USEFUL BAND OF A SIGNAL GENERATED WITH A FOURIER TRANSFORM, FOR FIXED-POINT MICROPROCESSORS

(75) Inventor: Michele Bargauan, Milan (IT)

(73) Assignee: M.B. International S.r.L., Livigno (IT)

( * ) Notice: Subject to any disclaimer, the term of this patent is extended or adjusted under 35 U.S.C. 154(b) by 0 days.

(21) Appl. No.: 09/356,554

(22) Filed: Jul. 19, 1999

(30) Foreign Application Priority Data

Oct. 6, 1998 (IT) .......................................... MI98A2148

(51) Int. Cl.⁷ .............................................. G06F 15/00
(52) U.S. Cl. ...................................................... 708/403
(58) Field of Search ........................... 708/403; 370/210

(56) References Cited

U.S. PATENT DOCUMENTS 4,574,311 A * 3/1986 Resnikoff et al. ............ 348/315
5,686,669 A * 11/1997 Hernandez et al. ............ 73/660
6,144,873 A * 11/2000 Madore et al. .............. 324/309
6,148,037 A * 11/2000 Abe ............................ 375/321

* cited by examiner

Primary Examiner—Tan V. Mai
(74) Attorney, Agent, or Firm—Guido Modiano; Albert Josif; Daniel O'Bryne

(57) ABSTRACT

A method for reducing computational errors in a useful band of a signal generated with a Fourier transform, particularly for fixed-point microprocessors, which comprises a step of shifting errors present in a signal due to Fourier transforms applied thereto, so that the errors straddle a frequency in which the information content of the signal is irrelevant.

9 Claims, 2 Drawing Sheets

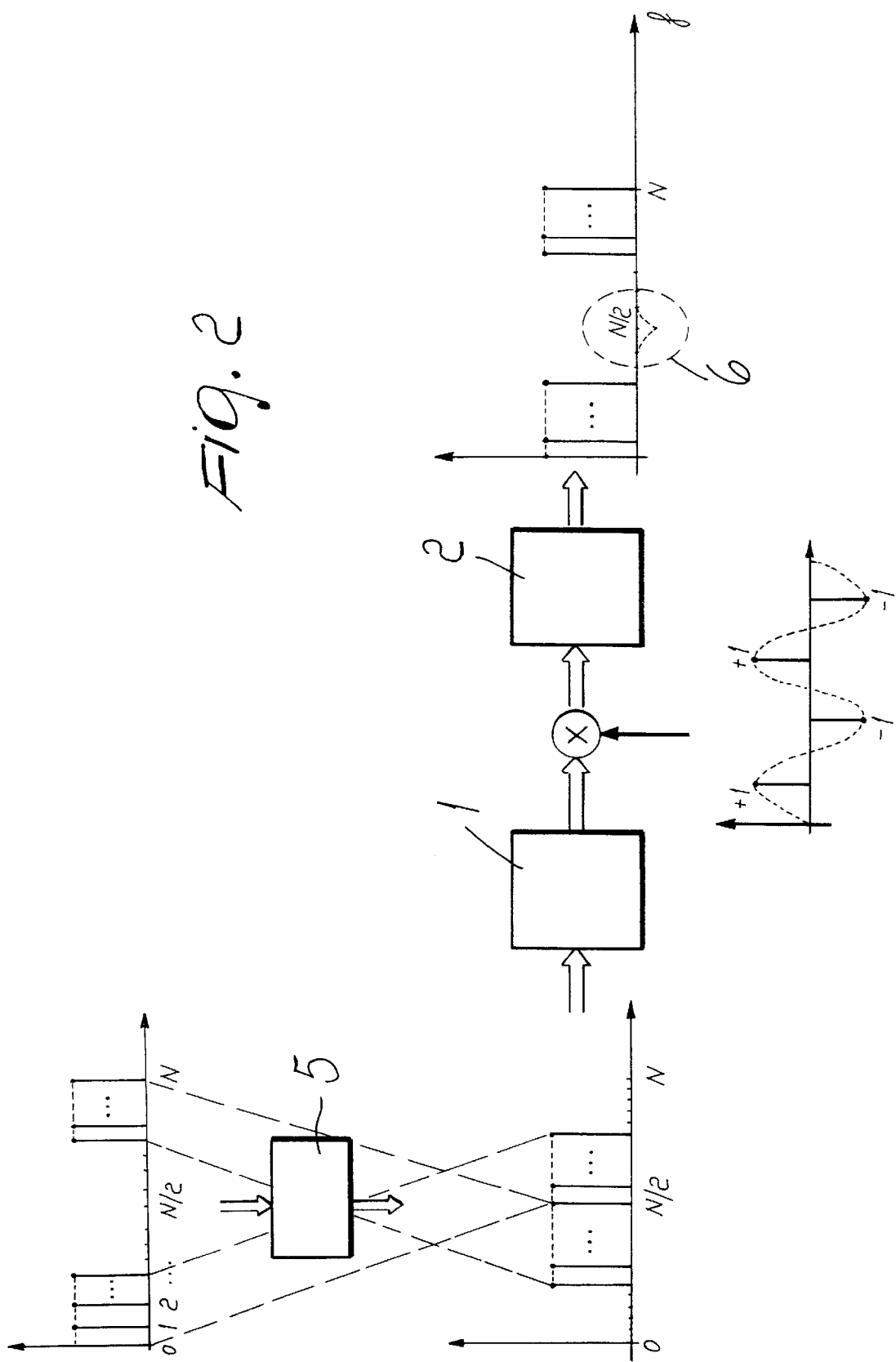

METHOD FOR REDUCING COMPUTATIONAL ERRORS IN A USEFUL BAND OF A SIGNAL GENERATED WITH A FOURIER TRANSFORM, FOR FIXED-POINT MICROPROCESSORS

BACKGROUND OF THE INVENTION

The present invention relates to a method for reducing computational errors in the useful band of a signal generated with a Fourier transform, particularly for fixed-point microprocessors.

More particularly, the invention relates to a method for reducing frequency errors due to computational errors.

It is known that the direct or inverse execution of Fourier transforms on discrete signals to obtain a time-continuous signal requires data with a great dynamic range, especially when the number of samples transformed is large.

Scientific applications normally use floating-point notations which ensure adequate dynamic range and precision: this approach is also used by high-level applications, in which the cost of the processing hardware is a secondary factor which is overruled by the precision of the result to be obtained.

The use of algorithms such as a Fourier transform in consumer applications, however, requires implementation using low-cost processors, particularly fixed-point processors with a limited dynamic range (i.e., a small number of bits).

The use of this type of processor generates results whose errors are more noticeable at the frequencies close to zero.

As the number of points on which a transform is performed increases, a fixed-point processor introduces increasingly large errors which are particularly noticeable proximate to the zero frequency, as mentioned.

SUMMARY OF THE INVENTION

The aim of the present invention is therefore to provide a method for reducing computational errors in the useful band of a signal generated with a Fourier transform which allows to use fixed-point microprocessors and provide improved performance.

Within the scope of this aim, an object of the present invention is to provide a method for reducing computational errors in the useful band of a signal generated with a Fourier transform, wherein the noise due to the use of a fixed-point microprocessor can be shifted into the band of the signal that is not of interest for the specific application for which said signal is meant.

Another object of the present invention is to provide a method for reducing computational errors in the useful band of a signal generated with a Fourier transform which is particularly useful in the case of signals of the OFDM (Orthogonal Frequency Division Multiplex) type generated by a digital signal processor (DSP).

Another object of the present invention is to provide a method for reducing computational errors in the useful band of a signal generated with a Fourier transform, particularly for fixed-point microprocessors, which is highly reliable, relatively easy to provide and at competitive costs.

This aim, these objects and others which will become apparent hereinafter are achieved by a method for reducing computational errors in the useful band of a signal generated with a Fourier transform, particularly for fixed-point microprocessors, characterized in that it comprises a step of shifting errors present in a signal due to Fourier transforms applied to it, so that said errors straddle a frequency in which the information content of said signal is irrelevant.

BRIEF DESCRIPTION OF THE DRAWINGS

Further characteristics and advantages of the invention will become apparent from the description of a preferred but not exclusive embodiment of the method according to the invention, illustrated only by way of nonlimitative example in the accompanying drawings, wherein:

FIG. 2 illustrates the method according to the present invention.

DESCRIPTION OF THE PREFERRED EMBODIMENTS

Figure 1:
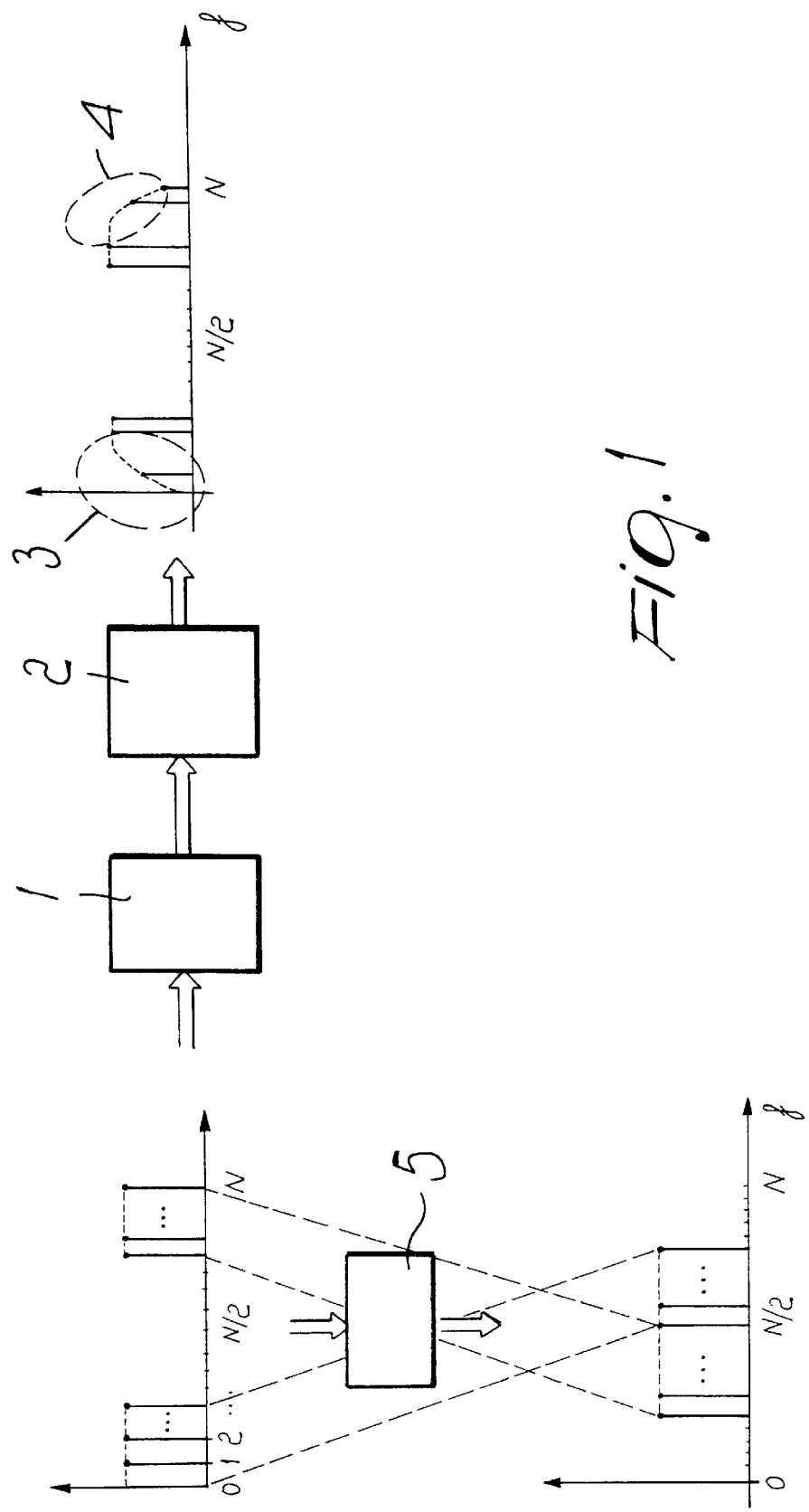
FIG. 1 shows a conventional Fourier transform method.

With reference to the above Figures, the method according to the invention is first described in the case of signals generated with an inverse fast Fourier transform by means of a fixed-point processor. The method described hereinafter is useful for example in the case of OFDM signals generated by a digital signal processor (DSP).

FIG. 1 illustrates a conventional method in which the signal is sampled, as shown in the left portion of FIG. 1. At this point the inverse (or direct) Fourier transform is performed, steps 1 and 2, producing a signal as shown in the chart of the right portion of FIG. 1. The portions shown in dashed lines indicate the computational error due to truncation which is present in the useful band of the signal.

FIG. 2 instead illustrates the method according to the invention, and the chart shown in the left portion of the Figure is directly correlated to the corresponding chart of FIG. 1.

Therefore, in the case of a method which uses a fast and inverse Fourier transform, the first step of the method according to the invention consists in shifting the signal to be subjected to the Fourier transform (step indicated by the block 5 of FIG. 2), centering at a frequency equal to the Nyquist frequency (N/2) instead of in the base band, i.e., at the zero frequency.

This shift is equivalent to changing the indices of the useful signals in the input array and causes no expenditure of computational resources.

At this point the inverse fast Fourier transform is computed according to a conventional method and the next step provides for the repositioning of the frequencies in the correct place by modulating the signal with a unitary tone at the Nyquist frequency. This is equivalent to multiplying the signal alternately by 1 and −1, since the signal is modulated with a sinusoid at the Nyquist frequency (as shown in the bottom chart of FIG. 2), and the samples of this signal are taken at the maximum and minimum times.

With this method, the errors that initially were at the zero frequency are shifted to the Nyquist frequency (N/2), as indicated by the shaded portion 6 in the chart to the right in FIG. 2.

The errors on the new zero frequency are actually errors on the Nyquist frequency of the original signal, i.e., before frequency rearrangement.

The step of multiplying by −1 can also be carried out by appropriately modifying the coefficients of the last step of the inverse Fourier transform and/or by performing, again in this last step, sums instead of subtractions and subtractions instead of sums, therefore without any computational burden.

In the case of a direct fast Fourier transform method, the inverse of the above method is performed.

First of all, therefore, the signal is converted by alternately multiplying the samples by +1 and −1 and then the fast Fourier transform is performed with a conventional method; finally, the frequencies are shifted as described in the first step of the method presented in case of application to a signal processed by means of an inverse fast Fourier transform.

In practice it has been observed that the method according to the invention fully achieves the intended aim, since it allows to perform on the signal direct or inverse fast Fourier transforms with fixed-point processors, which are less expensive than floating-point processors used conventionally for this type of operation.

The shifting of the generated noise so that it straddles the zero frequency in fact allows to have a cleaner signal in the band of interest and therefore to transfer the noise so that it straddles the Nyquist frequency, therefore in a region where typically there are no useful signals and therefore the noise generated does not degrade the quality of the generated signals.

The method according to the invention is particularly adapted if one wishes to produce quality results or which require data with a wide dynamic range. In this case, the number of samples is high, there is a plurality of stages and the computational errors also have a considerable weight.

The method thus conceived is susceptible of numerous modifications and variations, all of which are within the scope of the inventive concept; all the steps can furthermore be replaced with other technically equivalent ones.

The disclosures in Italian Patent Application No. MI98A002148 from which this application claims priority are incorporated herein by reference.

What is claimed is:

1. A method for reducing computational errors in a useful band of a signal generated with a Fourier transform, for fixed-point microprocessors, comprising a step of shifting errors present in a signal due to Fourier transforms applied thereto, so that said errors straddle a frequency in which the information content of said signal is irrelevant.

2. The method according to claim 1, wherein if said signal is to be subjected to an inverse Fourier transform it is shifted and centered around the Nyquist frequency so as to shift said errors to a frequency band which is not of interest.

3. The method according to claim 2, further comprising the step of calculating the inverse Fourier transform of said signal.

4. The method according to claim 3, comprising, after the computation of the inverse Fourier transform, a step of rearranging the frequencies of said signal by modulating it with a unitary tone at the Nyquist frequency.

5. The method according to claim 4, wherein said modulation step consists in multiplying said signal alternately by 1 and by −1.

6. The method according to claim 5, wherein said step that consists in multiplying said signal by −1 consists in modifying coefficients of a last step of said inverse Fourier transform.

7. The method according to claim 1, wherein if said signal is to be subjected to a direct Fourier transform, said signal is modulated with a unitary tone.

8. The method according to claim 7, comprising, after the modulation step, a step of performing the direct Fourier transform of said signal.

9. The method according to claim 8, comprising a step of shifting the frequencies of said signal so that they straddle the Nyquist frequency.

\* \* \* \* \*